US008160826B2

(12) United States Patent
Lai et al.

(10) Patent No.: US 8,160,826 B2
(45) Date of Patent: Apr. 17, 2012

(54) METHOD AND SYSTEM FOR ESTIMATING USE TIME OF ELECTRIC APPLIANCES

(75) Inventors: Hung-Ren Lai, Hualien County (TW); Chi-Tai Cheng, Changhua County (TW)

(73) Assignee: Institute for Information Industry, Taipei (TW)

( * ) Notice: Subject to any disclaimer, the term of this patent is extended or adjusted under 35 U.S.C. 154(b) by 353 days.

(21) Appl. No.: 12/631,866

(22) Filed: Dec. 7, 2009

(65) Prior Publication Data

US 2011/0119002 A1 May 19, 2011

(30) Foreign Application Priority Data

Nov. 13, 2009 (TW) .................................. 98138646

(51) Int. Cl.
*G06F 19/00* (2011.01)
*G06F 17/18* (2006.01)
*G06F 15/00* (2006.01)

(52) U.S. Cl. ........................... 702/61; 702/176; 702/179

(58) Field of Classification Search .................... 702/61, 702/176, 179; 700/276, 286
See application file for complete search history.

(56) References Cited

U.S. PATENT DOCUMENTS 5,499,190 A * 3/1996 Takahashi et al. .............. 702/71
2011/0125436 A1* 5/2011 Watanabe et al. ............... 702/65

* cited by examiner

*Primary Examiner* — Bryan Bui
(74) *Attorney, Agent, or Firm* — Jianq Chyun IP Office

(57) ABSTRACT

A method and a system for estimating use time of electric appliances are provided. In the present method, all time points corresponding to an appliance power on event or an appliance power off event are obtained according to a value-time curve of at least one electric characteristic. A characteristic value of each of the time points is calculated according to the value-time curve, so as to pair the time points corresponding to the appliance power off event with the time points corresponding to the appliance power on event appropriately. After the pairing process is accomplished, the use time of each of the electric appliances can be calculated by the paired time points and thereby the power consumption of the electric appliances can be figured out.

21 Claims, 3 Drawing Sheets

METHOD AND SYSTEM FOR ESTIMATING USE TIME OF ELECTRIC APPLIANCES

CROSS-REFERENCE TO RELATED APPLICATION

This application claims the priority benefit of Taiwan application serial no. 98138646, filed Nov. 13, 2009. The entirety of the above-mentioned patent application is hereby incorporated by reference herein and made a part of specification.

BACKGROUND OF THE INVENTION

1. Field of the Invention

The present invention relates to a method of obtaining power usage information. More particularly, the present invention relates to a method and a system for estimating use time of electric appliances while taking a loop as a measuring unit.

2. Description of Related Art

With a growing shortage of petroleum, electric power and other natural resources, concepts of environmental protection and energy conservation gradually draw attentions. According to statistics, about 39% energy is used in living environment of human beings. Therefore, more and more buildings start to use smart meters having an energy calculation ability, so as to provide various power usage information of the living environment for a user.

Generally, to determine power consumption information of various electric appliances in the building, a most direct approach is to install a measurement device similar to a small power meter on each of the electric appliances. Moreover, to collect a power usage status of each electric appliance for analysis, a radio frequency (RF) communication device or a power line communication (PLC) device is required to be installed on the electric appliance, so as to transmit the power usage information to a rear-end platform through the communication device for analysing. However, it is obvious that when a number of the electric appliances required to be measured is excessive, to install the measuring device and the communication device on each of the electric appliances not only requires a considerable amount of manpower, but also requires a huge cost.

According to another aspect, regarding the electric appliances with embedded power measuring devices in the market, although the power usage information thereof can be obtained, it has a high cost. Besides, unless the electric appliances in the environment are all replaced, the power usage information of the old electric appliances still has to be obtained through external measuring devices and communication devices.

SUMMARY OF THE INVENTION

Accordingly, the present invention is directed to a method for estimating use time of electric appliances, by which a loop is taken as a measuring unit to estimate the use time of the electric appliances.

The present invention is directed to a system for estimating use time of electric appliances, in which all time points of corresponding to appliance events are paired according to at least one electric characteristic, so as to calculate the use time of the electric appliances.

The present invention provides a method for estimating use time of electric appliances. The method can be descried as follows. First, a value-time curve of at least one electric characteristic on a loop is obtained. Next, a plurality of candidate event time points are obtained according to a fluctuation range of the value-time curve, and a plurality of candidate time intervals are divided according to a proximity degree of the candidate event time points, and a plurality of explicit event time points corresponding to the candidate time intervals are obtained. Next, statistics values of the electric characteristic in two time intervals formed by every three adjacent explicit event time points in all of the explicit event time points are calculated according to the value-time curve, so as to define a characteristic value of a middle explicit event time point in the three adjacent explicit event time points. Next, after all of the explicit event time points are paired to generate a plurality of candidate pair sets, differences of the characteristic values of the paired explicit event time points in each of the candidate pair sets are summed to serve as an appropriate degree of selection of the candidate pair set. Finally, a target pair set is selected according to the appropriate degrees of selection of the candidate pair sets to calculate the use time of the electric appliances on the loop.

In an embodiment of the present invention, the step of obtaining the candidate event time points according to the fluctuation range of the value-time curve comprises strengthening a waveform characteristic of the value-time curve to generate a relay value-time curve, and obtaining all of the time points in the relay value-time curve that a value fluctuation range thereof exceeds a threshold value to serve as the candidate event time points.

In an embodiment of the present invention, the step of obtaining the explicit event time points corresponding to the candidate time intervals comprises calculating a plurality of approach lines of the value-time curve in each of the candidate time intervals, and determining a time point having a maximum slope variation in the approach lines as one of the explicit event time points.

In an embodiment of the present invention, the step of calculating the statistics values of the electric characteristic in two time intervals formed by every three adjacent explicit event time points in all of the explicit event time points according to the value-time curve, so as to define the characteristic value of the middle explicit event time point in the three adjacent explicit event time points comprises: for every three adjacent explicit event time points, calculating a first statistics value of the electric characteristic between an earlier explicit event time point and the middle explicit event time point; calculating a second statistics value of the electric characteristic between the middle explicit event time point and a later explicit event time point; and calculating a difference between the second statistics value and the first statistics value to serve as the characteristic value of the middle explicit event time point.

In an embodiment of the present invention, the step of calculating the statistics values of the electric characteristic in two time intervals formed by every three adjacent explicit event time points in all of the explicit event time points according to the value-time curve, so as to define the characteristic value of the middle explicit event time point in the three adjacent explicit event time points further comprises: determining whether each of the explicit event time points corresponds to an appliance power off event or an appliance power on event according to a relative difference between the characteristic values of two adjacent explicit event time points in the explicit event time points is positive or negative.

In an embodiment of the present invention, the step of pairing the explicit event time points to generate the candidate pair sets comprises pairing the explicit event time points corresponding to the appliance power off event with the explicit event time points corresponding to the appliance power on event for all of the explicit event time points, so as to generate the candidate pair sets.

In an embodiment of the present invention, the step of pairing the explicit event time points corresponding to the appliance power off event with the explicit event time points corresponding to the appliance power on event comprises pairing the explicit event time points corresponding to the appliance power off event with the explicit event time points with earlier occurrence timing and corresponding to the appliance power on event.

In an embodiment of the present invention, the explicit event time points corresponding to the appliance power off event are one-by-one paired with the explicit event time points corresponding to the appliance power on event.

In an embodiment of the present invention, the step of selecting the target pair set according to the appropriate degree of selection of each of the candidate pair sets to calculate the use time of the electric appliance on the loop comprises: selecting one of the candidate pair sets having the relatively high appropriate degree of selection to serve as the target pair set; calculating a difference in each pair of the explicit event time points in the target pair set to serve as a partial use time of one of the electric appliances; and summing the partial use times of each of the electric appliances to serve as a current total use time of each of the electric appliances.

In an embodiment of the present invention, the electric characteristic comprises one of current, voltage, real power, reactive power, apparent power and power factor.

The present invention provides a system for estimating use time of electric appliances. The system includes a power measuring device, a time point selecting module and a pairing module. The power measuring device is used for detecting at least one electric characteristic on a loop. The time point selecting module is coupled to the power measuring device for obtaining a value-time curve of the electric characteristic, obtaining a plurality of candidate event time points according to a fluctuation range of the value-time curve, dividing a plurality of candidate time intervals according to a proximity degree of the candidate event time points, and obtaining a plurality of explicit event time points corresponding to the candidate time intervals. The pairing module is coupled to the time point selecting module, and is used for calculating statistics values of the electric characteristic in two time intervals formed by every three adjacent explicit event time points in all of the explicit event time points according to the value-time curve, so as to define a characteristic value of a middle explicit event time point in the three adjacent explicit event time points. After the pairing module pairs all of the explicit event time points to generate a plurality of candidate pair sets, the pairing module sums differences of the characteristic values of the paired explicit event time points in each of the candidate pair sets to serve as an appropriate degree of selection of the candidate pair set, and selects a target pair set according to the appropriate degree of selection of each of the candidate pair sets to calculate the use time of the electric appliances on the loop.

In an embodiment of the present invention, the time point selecting module strengthens a waveform characteristic of the value-time curve to generate a relay value-time curve, and obtains all of the time points in the relay value-time curve that a value fluctuation range thereof exceeds a threshold value to serve as the candidate event time points.

In an embodiment of the present invention, the time point selecting module calculates a plurality of approach lines of the value-time curve in each of the candidate time intervals, and determines a time point having a maximum slope variation in the approach lines as one of the explicit event time points.

In an embodiment of the present invention, for every three adjacent explicit event time points, the pairing module calculates a first statistics value of the electric characteristic between an earlier explicit event time point and the middle explicit event time point, calculates a second statistics value of the electric characteristic between the middle explicit event time point and a later explicit event time point, and calculates a difference between the second statistics value and the first statistics value to serve as the characteristic value of the middle explicit event time point.

In an embodiment of the present invention, the pairing module determines whether each explicit event time point corresponds to an appliance power off event or an appliance power on event according to a relative difference between the characteristic values of two adjacent explicit event time points in the explicit event time points is positive or negative.

In an embodiment of the present invention, the pairing module pairs the explicit event time points corresponding to the appliance power off event with the explicit event time points corresponding to the appliance power on event for all of the explicit event time points, so as to generate the candidate pair sets.

In an embodiment of the present invention, the pairing module pairs the explicit event time points corresponding to the appliance power off event with the explicit event time points with earlier occurrence timing and corresponding to the appliance power on event.

In an embodiment of the present invention, the pairing module one-by-one pairs the explicit event time points corresponding to the appliance power off event with the explicit event time points corresponding to the appliance power on event.

In an embodiment of the present invention, the pairing module selects the candidate pair set having the relatively high appropriate degree of selection from the candidate pair sets to serve as the target pair set, calculates a difference in each pair of the explicit event time points in the target pair set to serve as a partial use time of one of the electric appliances, and sums the partial use times of each of the electric appliances to serve as a current total use time of each of the electric appliances.

In an embodiment of the present invention, the electric characteristic comprises one of current, voltage, real power, reactive power, apparent power and power factor.

In an embodiment of the present invention, the power measuring device is a power meter or a smart meter, etc.

According to the above descriptions, in the present invention, after the value-time curve of at least one electric characteristic on the loop is obtained, all of the explicit event time points corresponding to the appliance power on event or the appliance power off event are determined, and the explicit event time points corresponding to the appliance power off event are suitably paired with the time points corresponding to the appliance power on event according to the characteristic values of the explicit event time points, so as to calculate the use time of the electric appliance. Therefore, a cost for determining the power usage information can be greatly reduced without installing an extra power measuring device on each of the electric appliances.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
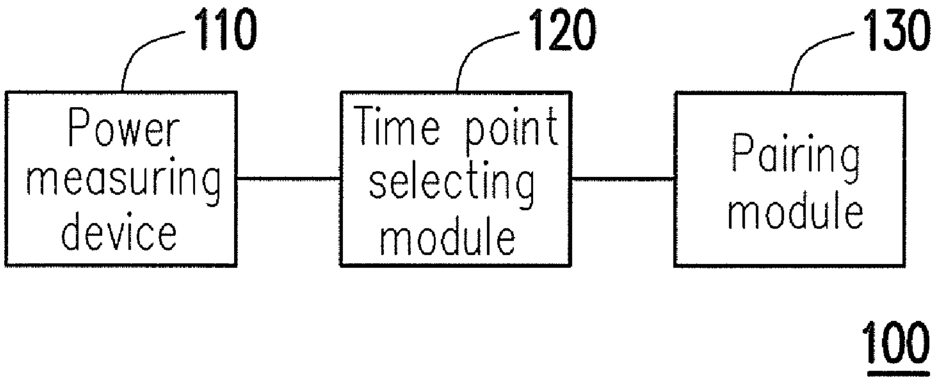
FIG. 1 is a block diagram illustrating a system for estimating use time of electric appliances according to an embodiment of the present invention.

FIG. 1 is a block diagram illustrating a system for estimating use time of electric appliances according to an embodiment of the present invention. Referring to FIG. 1, the system 100 includes a power measuring device 110, a time point selecting module 120 and a pairing module 130.

In the present embodiment, the power measuring device 110 is used for detecting one or a plurality of electric characteristics on a loop. Namely, after the power measuring device 110 is installed on a power loop having a plurality of electric appliances, the power measuring device 110 can measure variation of at least one electric characteristic on the power loop, such as current, voltage, real power, reactive power, apparent power or power factor, etc. For example, the power measuring device 110 can be a power meter or a smart meter, etc.

The time point selecting module 120 is coupled to the power measuring device 110, and is used for establishing a value-time curve of the electric characteristic after obtaining information of the electric characteristic through the power measuring device 110, so as to analyse all of explicit event time points corresponding to an appliance power on event or an appliance power off event on the loop.

The pairing module 130 is coupled to the time point selecting module 120, and is used for calculating a characteristic value of each of the explicit event time points, so as to pair the explicit event time points according to the characteristic values. Two explicit event time points paired by the pairing module 130 represent a power on time and a power off time of a same electric appliance. The pairing module 130 can estimate the use time of each of the electric appliances according to all of the paired explicit event time points, so as to calculate a power consumption of each of the electric appliances.

It should be noticed that since the power measuring device 110 can detect at least one electric characteristic on the loop, the time point selecting module 120 and the pairing module 130 can implement a search and pairing procedure of the explicit event time points according to one or a plurality of electric characteristics. In other words, even if there is a plurality of electric appliance having similar performance in a certain electric characteristic on the loop, the system 100 for estimating the use time of the electric appliances can still ensure a correctness of an estimating result by simultaneously using multiple electric characteristics for estimation.

Figure 2:
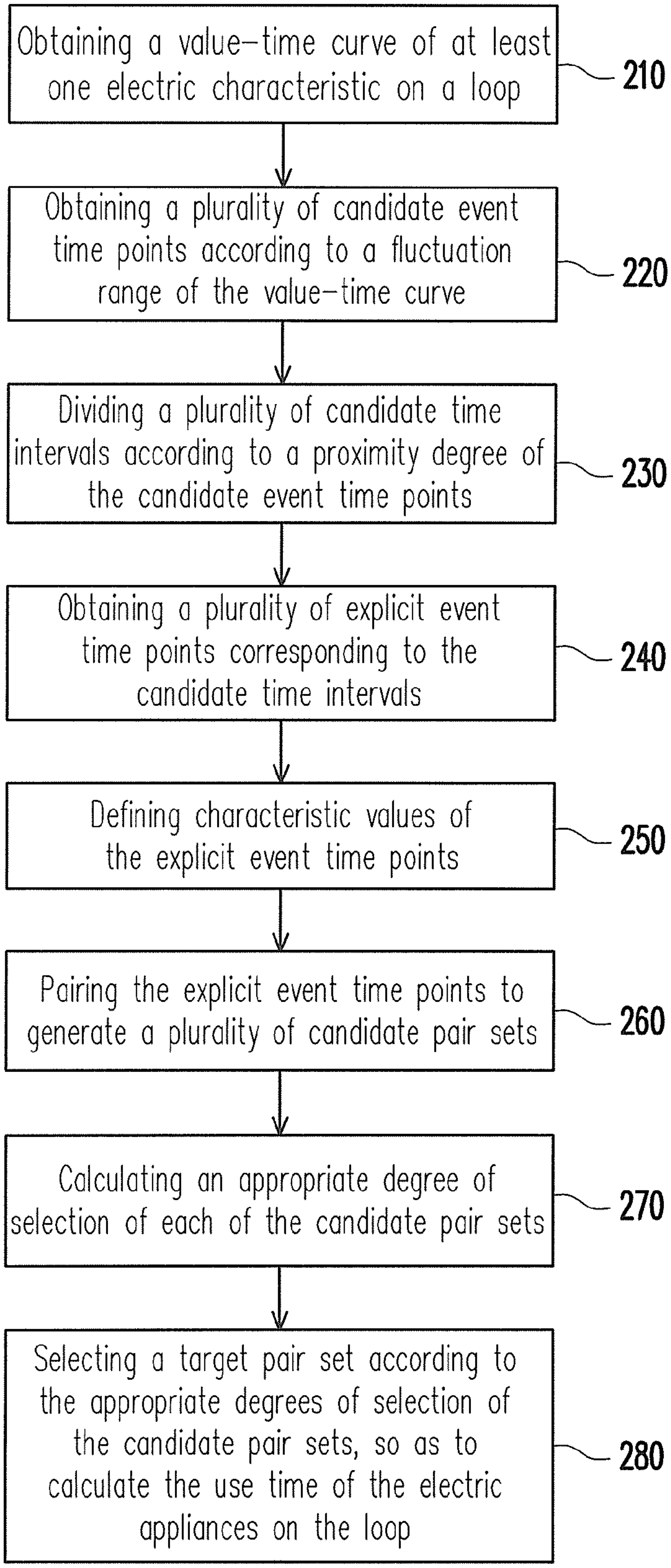
FIG. 2 is a flowchart illustrating a method for estimating use time of electric appliances according to an embodiment of the present invention.

Another embodiment of the present invention is provided for describing a detail operation flow of the system 100 for estimating the use time of the electric appliances. FIG. 2 is a flowchart illustrating a method for estimating the use time of the electric appliances according to an embodiment of the present invention. In the system 100 for estimating the use time of the electric appliances, the power measuring device 110 continually detects value data of at least one electric characteristic on the loop, and transmits the value data to the time point selecting module 120. A transmission interface between the power measuring device 110 and the time point selecting module 120 can be any wired or wireless transmission interface, which is not limited by the present invention.

In step 210, the time point selecting module 120 processes the value data of the at least one electric characteristic that is provided by the power measuring device 110, so as to generate a value-time curve of the at least one electric characteristic. In detail, since the value data relates to the factors such as a power variation amount, a transmission stability and a transmission timing, etc. of the electric appliances, the time point selecting module 120 first corresponds the values detected by the power measuring device 110 to a correct time axis, and then compensates the value data corresponding to each time point through a data compensation operation, and filters transient noises to generate a relatively smooth value-time curve.

In step 220, the time point selecting module 120 obtains a plurality of candidate event time points according to a fluctuation range of the value-time curve. In the present embodiment, the time point selecting module 120 first strengthens a waveform characteristic of the value-time curve, so as to generate a relay value-time curve easy for reading and determining. For example, the time point selecting module 120 can filter the values with transient appearing time or little variation, so as to generate the relay value-time curve. Then, the time point selecting module 120 obtains all of the time points in the relay value-time curve that a value fluctuation range thereof exceeds a threshold value to serve as the candidate event time points. In other words, all of the time points corresponding to the electric characteristic values having a great variation are taken as the candidate event time points by the time point selecting module 120.

Next, in step 230, the time point selecting module 120 divides a plurality of candidate time intervals according to a proximity degree of the candidate event time points. Namely, the candidate event time points having a time difference within a specific range are integrated as a same candidate time interval by the time point selecting module 120.

In step 240, the time point selecting module 120 obtains a plurality of explicit event time points corresponding to the candidate time intervals. In detail, regarding each of the candidate time intervals, the time point selecting module 120 calculates a plurality of approach lines of the value-time curve in each of the candidate time intervals according to, for example, a least-square method. In all of the approach lines of each candidate time interval, the time point selecting module 120 determines a time point having a maximum slope variation as an explicit event time point that the appliance event is actually occurred. It should be noticed that in the other embodiments, the time point selecting module 120 can also select one explicit event time point from each of the candidate time intervals according to different value analysis methods.

After all of the explicit event time points are obtained, the pairing module 130 pairs the explicit event time points. In step 250, the pairing module 130 defines a characteristic value of each of the explicit event time points. In the present embodiment, regarding all of the explicit event time points, the pairing module 130 calculates statistics values of the at least one electric characteristic in two time intervals formed by three adjacent explicit event time points according to the value-time curve, so as to define a characteristic value of a middle explicit event time point in the three adjacent explicit event time points according to the statistics values.

Figure 3:
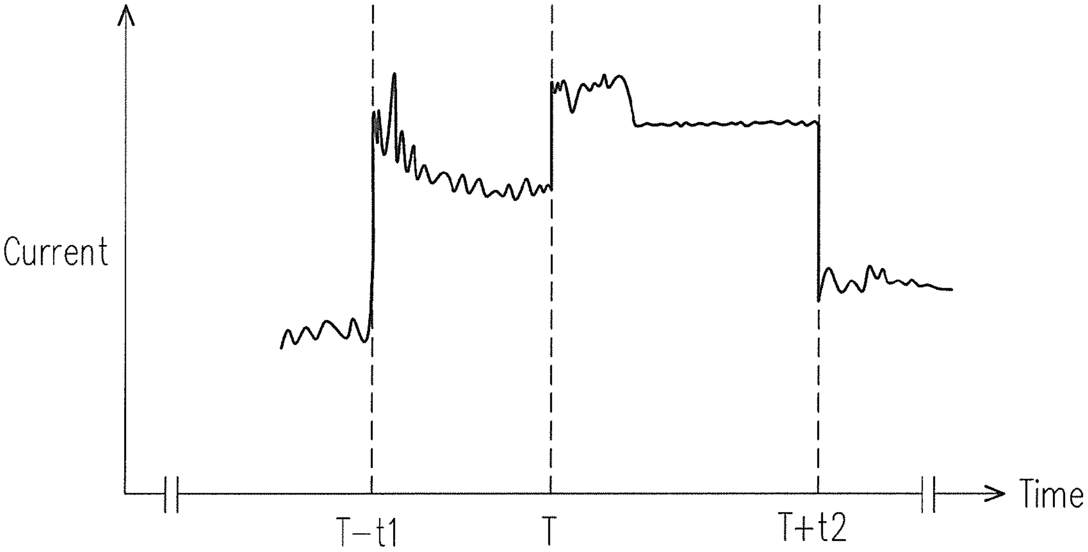
FIG. 3 is a schematic diagram illustrating a part of current-time curve according to an embodiment of the present invention.

Taking a value-time curve of the electric characteristic of current as an example, in a part of value-time curve shown in FIG. 3, the time point selecting module 120 obtains three adjacent explicit event time points (T−t1), T and (T+t2). The pairing module 130 obtains all of current values between the explicit event time point (T−t1) and the explicit event time point T according to the value-time curve, and calculates an average of the current values to serve as a first statistics value. The pairing module 130 also obtains all of current values between the explicit event time point T and the explicit event time point (T+t2) according to the value-time curve, and calculates an average of the current values to serve as a second statistics value. Then, the pairing module 130 defines a difference between the second statistics value and the first statistics value as the characteristic value of the explicit event time point T. Besides the method of calculating an arithmetic mean value, the pairing module 130 can also obtain the first and the second statistics values by calculating a mode, a median, or other statistics values, etc.

The characteristic value of each explicit event time point can be calculated according to the above method. Then, regarding all of the explicit event time points, the pairing module 130 determines whether each explicit event time point corresponds to the appliance power off event or the appliance power on event according to a relative difference between the characteristic values of two adjacent explicit event time points is positive or negative.

In detail, regarding two adjacent explicit event time points, after the characteristic value of a later explicit event time point thereof is subtracted by the characteristic value of an earlier explicit event time point thereof, whether the characteristic value is increased or decreased can be determined according to whether the difference is positive or negative. If the difference is positive, it represents that the characteristic value is increased, so that the pairing module 130 determines that the later explicit event time point corresponds to the appliance power on event. Conversely, if the difference is negative, it represents that the characteristic value is decreased, so that the pairing module 130 determines that the later explicit event time point corresponds to the appliance power off event.

In step 260, the pairing module 130 pairs all of the explicit event time points to generate a plurality of candidate pair sets. In the present embodiment, the pairing module 130 exhausts all pairing possibilities of the explicit event time points according to a rule that the explicit event time points corresponding to the appliance power off event are paired with the explicit event time points corresponding to the appliance power on event, so as to generate the aforementioned candidate pair sets.

In an embodiment, to further obtain reasonable candidate pair sets, during a pairing process of the pairing module 130, the explicit event time points corresponding to the appliance power off event are only paired with the explicit event time points with earlier occurrence timing and corresponding to the appliance power on event. For example, assuming a fifth explicit event time point in a timing sequence corresponds to the appliance power off event, the pairing module 130 only selects the appliance power on events that can be paired with the fifth explicit event time point from a first to a fourth explicit event time points.

Moreover, during the pairing process of the pairing module 130, the explicit event time points corresponding to the appliance power off event are one-by-one paired with the explicit event time points corresponding to the appliance power on event, so as to ensure a uniqueness of the pairing. Namely, the paired explicit event time points are not again paired with the other explicit event time points by the pairing module 130.

After the candidate pair sets are generated, in step 270, the pairing module 130 calculates an appropriate degree of selection of each of the candidate pair sets. In detail, regarding each of the candidate pair sets, the pairing module 130 sums differences of the characteristic values of the paired explicit event time points to serve as the appropriate degree of selection of the candidate pair set. In the present embodiment, the pairing module 130, for example, calculates the difference of the characteristic values of the paired explicit event time points according to an Euclidean distance. In detail, if the pairing module 130 calculates the characteristic value of each of the explicit event time points according to n electric characteristics detected by the power measuring device 110, the pairing module 130 calculates a difference $D_{AB}$ of the characteristic values of the paired explicit event time points A and B according to a following equation:

$$D_{AB} = \sqrt{\sum_i (X_{iA} - X_{iB})^2}\,,\ i = 1, 2, \ldots\ , n$$

Where, $X_{iA}$ represents a characteristic value of the explicit event time point A that is obtained according to the value-time curve of an electric characteristic i, and $X_{iB}$ represents a characteristic value of the explicit event time point B that is obtained according to the value-time curve of the electric characteristic i. In a candidate pair set, the difference of the characteristic values of each paired explicit event time points can be calculated according to the above equation, and the sum of the differences of the characteristic values is the appropriate degree of selection of such candidate pair set.

Finally, in step 280, the pairing module 130 selects a target pair set according to the appropriate degree of selection of each of the candidate pair sets, so as to calculate the use time of the electric appliances on the loop. In the present embodiment, the pairing module 130 selects the candidate pair set having a relatively high (for example, the highest) appropriate degree of selection from all of the candidate pair sets to serve as the target pair set. Then, the pairing module 130 calculates a time difference in each pair of the explicit event time points in the target pair set to serve as a partial use time of one of the electric appliances (i.e. a common electric appliance corresponding to the paired explicit event time points). Wherein, a type of the electric appliance corresponding to the paired explicit event time points can be provided by the user. Finally, the pairing module 130 sums the partial use times corresponding to the same one of the electric appliances to serve as a current total use time of the said electric appliance.

Figure 4:
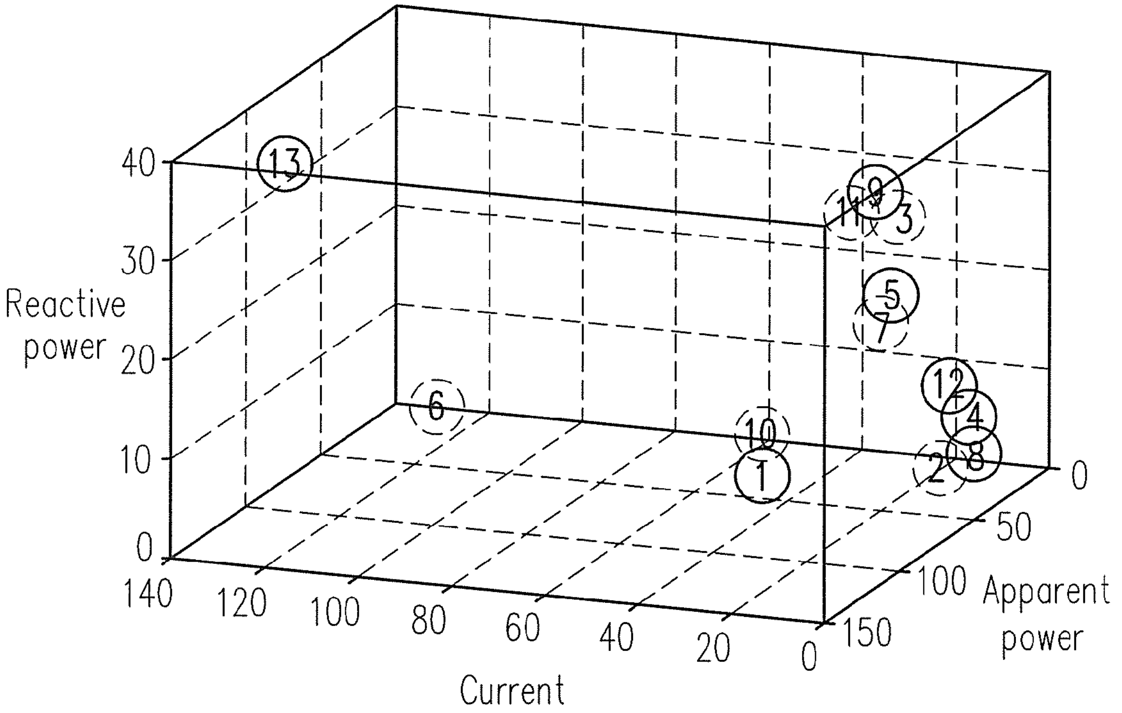
FIG. 4 is a schematic diagram illustrating a three-dimensional characteristic space according to another embodiment of the present invention.

In a following embodiment, assuming the time point selecting module 120 currently obtains 13 explicit event time points, and the pairing module 130 obtains the characteristic values of the explicit event time points according to the value-time curves of three electric characteristics of current, reactive power and apparent power. If each kind of the electric characteristic is regarded as one dimension in space, as shown in FIG. 4, the appliance events corresponding to all of the explicit event time points can be distributed at different positions in a three-dimensional characteristic space according to the characteristic values thereof. Wherein, a dotted circle represents the appliance power off event, and a solid line circle represents the appliance power on event. After the calculation of the appropriate degrees of selection and the selection of the target pair set, the pairing module 130 can pair an appliance power off event in the three-dimensional characteristic space with a closest appliance power on event.

In the present embodiment, the pairing module 130 obtains the explicit event time points of the appliance power on event in allusion to the explicit event time points of the appliance power off event, so as to deduce the total use time of the electric appliance. As long as a plurality of the electric characteristics are simultaneously referred, even if there is a plurality of electric appliance having similar performance in a certain electric characteristic, a correctness of the paired explicit event time points can still be ensured based on assistance of the other electric characteristics.

In summary, according to the method and the system for estimating the use time of the electric appliances of the present invention, all of the explicit event time points corresponding to the appliance power off event or the appliance power on event are obtained according to the value-time curve of the at least one electric characteristic, and which of the explicit event time point corresponding to the appliance power on event is paired with the explicit event time point corresponding to the appliance power off event is determined, so as to calculates the use time of the electric appliance. By such means, the user can get to know his/her own power usage habit, which avails a purpose of saving electric power. Moreover, a single power measuring device can be used to estimate the use time of the electric appliances while taking a loop as a measuring unit without any prior learning process. Therefore, the time, the human labour cost and the money cost used for estimating the use time of the electric appliances can be greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for estimating use time of electric appliances, comprising:

- obtaining a value-time curve of at least one electric characteristic on a loop;
- obtaining a plurality of candidate event time points according to a fluctuation range of the value-time curve;
- dividing a plurality of candidate time intervals according to a proximity degree of the candidate event time points;
- obtaining a plurality of explicit event time points corresponding to the candidate time intervals;
- calculating statistics values of the at least one electric characteristic in two time intervals formed by every three adjacent explicit event time points in all of the explicit event time points according to the value-time curve, so as to define a characteristic value of a middle explicit event time point in the three adjacent explicit event time points;
- pairing the explicit event time points to generate a plurality of candidate pair sets;
- summing differences of the characteristic values of the explicit event time points which are paired in each of the candidate pair sets to serve as an appropriate degree of selection of the candidate pair set; and
- selecting a target pair set according to the appropriate degree of selection of each of the candidate pair sets, so as to calculate the use time of the electric appliances on the loop.

2. The method for estimating the use time of the electric appliances as claimed in claim 1, wherein the step of obtaining the candidate event time points according to the fluctuation range of the value-time curve comprises:

- strengthening a waveform characteristic of the value-time curve to generate a relay value-time curve; and
- obtaining each of the time points in the relay value-time curve which has a value fluctuation range exceeding a threshold value to serve as the candidate event time points.

3. The method for estimating the use time of the electric appliances as claimed in claim 1, wherein the step of obtaining the explicit event time points corresponding to the candidate time intervals comprises:

- calculating a plurality of approach lines of the value-time curve in each of the candidate time intervals, and determining a time point having a maximum slope variation in the approach lines as one of the explicit event time points.

4. The method for estimating the use time of the electric appliances as claimed in claim 1, wherein the step of calculating the statistics values of the at least one electric characteristic in two time intervals formed by every three adjacent explicit event time points in all of the explicit event time points according to the value-time curve, so as to define the characteristic value of the middle explicit event time point in the three adjacent explicit event time points comprises:

- for every three adjacent explicit event time points, calculating a first statistics value of the at least one electric characteristic between an earlier explicit event time point and the middle explicit event time point;
- calculating a second statistics value of the at least one electric characteristic between the middle explicit event time point and a later explicit event time point; and
- calculating a difference between the second statistics value and the first statistics value to serve as the characteristic value of the middle explicit event time point.

5. The method for estimating the use time of the electric appliances as claimed in claim 1, wherein the step of calculating the statistics values of the at least one electric characteristic in two time intervals formed by every three adjacent explicit event time points in all of the explicit event time points according to the value-time curve, so as to define the characteristic value of the middle explicit event time point in the three adjacent explicit event time points further comprises:

- determining whether each of the explicit event time points corresponds to an appliance power off event or an appliance power on event according to a relative difference between the characteristic values of two adjacent explicit event time points in the explicit event time points is positive or negative.

6. The method for estimating the use time of the electric appliances as claimed in claim 5, wherein the step of pairing the explicit event time points to generate the candidate pair sets comprises:

- pairing the explicit event time points corresponding to the appliance power off event with the explicit event time points corresponding to the appliance power on event for all of the explicit event time points, so as to generate the candidate pair sets.

7. The method for estimating the use time of the electric appliances as claimed in claim 6, wherein the step of pairing the explicit event time points corresponding to the appliance power off event with the explicit event time points corresponding to the appliance power on event comprises:

pairing the explicit event time points corresponding to the appliance power off event with the explicit event time points with earlier occurrence timing and corresponding to the appliance power on event.

8. The method for estimating the use time of the electric appliances as claimed in claim 6, wherein the explicit event time points corresponding to the appliance power off event are one-by-one paired with the explicit event time points corresponding to the appliance power on event.

9. The method for estimating the use time of the electric appliances as claimed in claim 1, wherein the step of selecting the target pair set according to the appropriate degree of selection of each of the candidate pair sets to calculate the use time of the electric appliance on the loop comprises:

selecting one of the candidate pair sets having the appropriate degree of selection which is relatively high to serve as the target pair set;

calculating a difference in each pair of the explicit event time points in the target pair set to serve as a partial use time of one of the electric appliances; and summing the partial use times of each of the electric appliances to serve as a current total use time of each of the electric appliances.

10. The method for estimating the use time of the electric appliances as claimed in claim 1, wherein the at least one electric characteristic comprises one of current, voltage, real power, reactive power, apparent power and power factor.

11. A system for estimating use time of electric appliances, comprising:

a power measuring device, detecting at least one electric characteristic on a loop;

a time point selecting module, coupled to the power measuring device for obtaining a value-time curve of the at least one electric characteristic, obtaining a plurality of candidate event time points according to a fluctuation range of the value-time curve, dividing a plurality of candidate time intervals according to a proximity degree of the candidate event time points, and obtaining a plurality of explicit event time points corresponding to the candidate time intervals; and a pairing module, coupled to the time point selecting module, for calculating statistics values of the at least one electric characteristic in two time intervals formed by every three adjacent explicit event time points in all of the explicit event time points according to the value-time curve, so as to define a characteristic value of a middle explicit event time point in the three adjacent explicit event time points, pairing the explicit event time points to generate a plurality of candidate pair sets, summing differences of the characteristic values of the explicit event time points which are paired in each of the candidate pair sets to serve as an appropriate degree of selection of the candidate pair set, and selecting a target pair set according to the appropriate degree of selection of each of the candidate pair sets to calculate the use time of the electric appliances on the loop.

12. The system for estimating the use time of the electric appliances as claimed in claim 11, wherein the time point selecting module strengthens a waveform characteristic of the value-time curve to generate a relay value-time curve, and obtains each of the time points in the relay value-time curve which has a value fluctuation range exceeding a threshold value to serve as the candidate event time points.

13. The system for estimating the use time of the electric appliances as claimed in claim 11, wherein the time point selecting module calculates a plurality of approach lines of the value-time curve in each of the candidate time intervals, and determines a time point having a maximum slope variation in the approach lines as one of the explicit event time points.

14. The system for estimating the use time of the electric appliances as claimed in claim 11, wherein for every three adjacent explicit event time points, the pairing module calculates a first statistics value of the at least one electric characteristic between an earlier explicit event time point and the middle explicit event time point, calculates a second statistics value of the at least one electric characteristic between the middle explicit event time point and a later explicit event time point, and calculates a difference between the second statistics value and the first statistics value to serve as the characteristic value of the middle explicit event time point.

15. The system for estimating the use time of the electric appliances as claimed in claim 11, wherein the pairing module determines whether each of the explicit event time points corresponds to an appliance power off event or an appliance power on event according to a relative difference between the characteristic values of two adjacent explicit event time points in the explicit event time points is positive or negative.

16. The system for estimating the use time of the electric appliances as claimed in claim 15, wherein the pairing module pairs the explicit event time points corresponding to the appliance power off event with the explicit event time points corresponding to the appliance power on event for all of the explicit event time points, so as to generate the candidate pair sets.

17. The system for estimating the use time of the electric appliances as claimed in claim 16, wherein the pairing module pairs the explicit event time points corresponding to the appliance power off event with the explicit event time points with earlier occurrence timing and corresponding to the appliance power on event.

18. The system for estimating the use time of the electric appliances as claimed in claim 16, wherein the pairing module one-by-one pairs the explicit event time points corresponding to the appliance power off event with the explicit event time points corresponding to the appliance power on event.

19. The system for estimating the use time of the electric appliances as claimed in claim 11, wherein the pairing module selects one of the candidate pair sets having the appropriate degree of selection which is relatively high to serve as the target pair set, calculates a difference in each pair of the explicit event time points in the target pair set to serve as a partial use time of one of the electric appliances, and sums the partial use times of each of the electric appliances to serve as a current total use time of each of the electric appliances.

20. The system for estimating the use time of the electric appliances as claimed in claim 11, wherein the at least one electric characteristic comprises one of current, voltage, real power, reactive power, apparent power and power factor.

21. The system for estimating the use time of the electric appliances as claimed in claim 11, wherein the power measuring device comprises a power meter and a smart meter.

* * * * *